(12) United States Patent
Sato et al.

(10) Patent No.: US 9,175,195 B2
(45) Date of Patent: Nov. 3, 2015

(54) ADHESIVE HYDROGEL AND USE THEREOF

(75) Inventors: Kaori Sato, Nara (JP); Takaaki Hatori, Nara (JP); Yasuhiro Fujiwara, Nara (JP)

(73) Assignee: SEKISUI PLASTICS CO., LTD., Osaka (JP)

(*) Notice: Subject to any disclaimer, the term of this patent is extended or adjusted under 35 U.S.C. 154(b) by 0 days.

(21) Appl. No.: 14/362,515

(22) PCT Filed: Jul. 4, 2012

(86) PCT No.: PCT/JP2012/067108
§ 371 (c)(1),
(2), (4) Date: Jun. 3, 2014

(87) PCT Pub. No.: WO2013/099329
PCT Pub. Date: Jul. 4, 2013

(65) Prior Publication Data
US 2014/0296418 A1    Oct. 2, 2014

(30) Foreign Application Priority Data

Dec. 28, 2011  (JP) ................................. 2011-288771
Mar. 9, 2012   (JP) ................................. 2012-053016

(51) Int. Cl.
C08L 39/00   (2006.01)
C09D 5/02    (2006.01)
C09J 133/24  (2006.01)
C09J 133/02  (2006.01)
C09J 133/26  (2006.01)

(52) U.S. Cl.
CPC .............. *C09J 133/24* (2013.01); *C09J 133/02* (2013.01); *C09J 133/26* (2013.01)

(58) Field of Classification Search
CPC ............................. C09J 133/24; C09J 133/02
USPC ........................................................ 524/516
See application file for complete search history.

(56) References Cited

U.S. PATENT DOCUMENTS

| | | | | |
|---|---|---|---|---|
| 5,868,136 | A * | 2/1999 | Fox et al. | 600/391 |
| 7,868,072 | B2  | 1/2011 | Sasahara et al. | |
| 2007/0208130 | A1 | 9/2007 | Sasahara et al. | |
| 2009/0068388 | A1 * | 3/2009 | Tanaka et al. | 428/41.3 |

FOREIGN PATENT DOCUMENTS

| | | | | |
|---|---|---|---|---|
| CN | 1946826 | | 4/2007 | |
| JP | 03267041 | A * | 11/1991 | ............ A61B 5/0408 |
| JP | 2002356661 | A * | 12/2002 | ............ A61B 5/0408 |
| JP | 2003-096431 | | 4/2003 | |
| JP | 2003096431 | A * | 4/2003 | ............ C09J 201/00 |
| JP | 3437124 | | 6/2003 | |
| JP | 2009227924 | A * | 10/2009 | ............ C09J 201/00 |

OTHER PUBLICATIONS

Translation of JP 2002-356661, Dec. 13, 2002.*
Translation of JP 2009-227924, Oct. 8, 2009.*
Translation of Abstract of JP 3267041, Nov. 27, 1991.*
Translation of JP 2003-096431, Apr. 3, 2003.*
International Search Report for PCT/JP2012/067108, which was mailed on Aug. 7, 2014.
Chinese Office Action for Chinese Application No. 201280065046.0, mailed Jun. 1, 2015.

* cited by examiner

*Primary Examiner* — Hui Chin
(74) *Attorney, Agent, or Firm* — Greenblum & Bernstein, P.L.C.

(57) ABSTRACT

An adhesive hydrogel contains: a polymer matrix of a copolymer of a monofunctional monomer and a crosslinking monomer (a); another polymer component; water; and a polyhydric alcohol, wherein: either a structural unit derived from the monofunctional monomer contained in the polymer matrix or the other polymer component or both contain a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group; and the other polymer component contains a polymer compound (c) with a side chain having an oxyalkylene group or a polyoxyalkylene group.

16 Claims, No Drawings

ADHESIVE HYDROGEL AND USE THEREOF

TECHNICAL FIELD

The present invention relates to an adhesive hydrogel and its use (for a gel sheet and an electrode pad). The adhesive hydrogel exhibits excellent adhesive strength both initially and even after being used repeatedly. The adhesive hydrogel also shows a reduced abrupt drop of adhesive strength over repeated use and reduced skin irritation.

BACKGROUND ART

A hydrogel is basically a polymer, with high affinity for water, that has swelled in an aqueous solvent. Hydrogels have various useful properties including sufficient water absorbance, swellability, adhesiveness, and electrical conductivity. The hydrogel relies on these properties for its wide-ranging applications in civil engineering and construction, agriculture and horticulture, food industry, medical and pharmaceutical industry, cosmetics, electricity, and other fields.

For example, in medical practice, adhesive hydrogel is used as electrode pads for electrocardiogram instrumentation. Recently, it is also used as electrode pads for EMS (electrical muscle stimulation) devices in weight reduction and muscle training. An EMS device is an exercise machine that applies electrical stimulation to the skin through adhesive hydrogel electrode pads adhering to the skin, causing muscle to contract. The EMS device has seen increasing opportunities to be used in general households.

The adhesive hydrogel used for these electrode pads need to be capable of exerting a high adhesive strength onto the skin.

Patent Document 1, as an example, discloses technology to improve the adhesive strength of an adhesive hydrogel by using a water-soluble polymer in a predetermined quantity and also discloses medical electrodes fabricated from the adhesive hydrogel.

However, the hydrogel disclosed in Patent Document 1 quickly loses much of its adhesive strength over mere several times of attaching and peeling-off. The hydrogel disclosed in Patent Document 1 fails to deliver sufficient adhesive strength after being used repeatedly. The primary reason for the hydrogel reducing its adhesive strength after being used repeatedly would be the horn coming off the skin surface and sticking to the surface of the electrode pad when the electrode pad is peeled from the skin, which practically reduces the effective adhesive area of the electrode pad.

The hydrogel disclosed in Patent Document 1 has a major problem that even if it can have its initial adhesive strength improved, it still loses an appreciable proportion of its adhesive strength after being used repeatedly.

To maintain the adhesive strength of the hydrogel over repeated use, Patent Document 2, as an example, discloses technology to restore the adhesive strength of the hydrogel by washing, in water, the adhesive surface of the hydrogel which has reduced its adhesive strength over several times of attaching to, and peeling from, the skin.

The hydrogel described in Patent Document 2 requires washing in water and other manual processes. To ensure restoration of the adhesive strength of the hydrogel, the user needs to follow various instructions given in the product manual as to, for example, how the hydrogel should be washed and dried, which the user would find too complicated and laborious.

The hydrogel disclosed in Patent Document 2 also has a problem that even if it can have its initial adhesive strength improved, it still loses an appreciable proportion of its adhesive strength after being used repeatedly.

CITATION LIST

Patent Literature

Patent Document 1: Japanese Patent Application Publication, Tokukai, No. 2003-96431

Patent Document 2: Japanese Patent Publication No. 3437124.

SUMMARY OF THE INVENTION

Problems to be Solved by the Invention

The present invention, conceived in view of these problems, has an object to provide an adhesive hydrogel that exhibits excellent adhesive strength both initially and after being used repeatedly without a need for washing in water or any other like special jobs and that also shows a reduced abrupt drop of adhesive strength over repeated use and reduced skin irritation and to provide a gel sheet and electrode pad fabricated from the adhesive hydrogel.

Solution to Problem

An adhesive hydrogel in accordance with the present invention is an adhesive hydrogel containing: a polymer matrix of a copolymer of a monofunctional monomer and a crosslinking monomer (a); another polymer component; water; and a polyhydric alcohol, wherein: either a structural unit derived from the monofunctional monomer contained in the polymer matrix or the other polymer component or both contain a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group; and the other polymer component contains a polymer compound (c) with a side chain having an oxyalkylene group or a polyoxyalkylene group.

A gel sheet in accordance with the present invention contains an adhesive hydrogel in accordance with the present invention.

An electrode pad in accordance with the present invention contains an adhesive hydrogel in accordance with the present invention.

Advantageous Effects of the Invention

In the adhesive hydrogel in accordance with the present invention, either the structural unit derived from the monofunctional monomer contained in the polymer matrix or the other polymer component or both contain a structural unit derived from the at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group; and the other polymer component contains a polymer compound (c) with a side chain having an oxyalkylene group or a polyoxyalkylene group. Therefore, the adhesive hydrogel exhibits an improved initial adhesive strength without losing its high adhesive strength over repeated use. The present invention hence provides an adhesive hydrogel that exhibits excellent adhesive strength both initially and after being used repeatedly without a need for washing in water or any other like special jobs.

The gel sheet and electrode pad containing the adhesive hydrogel in accordance with the present invention are durable over repeated use when compared with conventional products. The gel sheet and electrode pad therefore have longer product life, are more economical, and contribute more to the conservation of resources. The gel sheet and electrode pad containing the adhesive hydrogel in accordance with the present invention exhibit initial adhesive strength that is superior to the initial adhesive strength achieved by conventional products, thereby being less likely to peel off from the skin and other objects to which the gel sheet and electrode pad are attached. The abrupt drop of adhesive strength over repeated use is, as described earlier, due to the horn being peeled from the skin. The adhesive hydrogel in accordance with the present invention does not abruptly lose its adhesive strength over repeated use and reduces skin irritation.

DESCRIPTION OF EMBODIMENTS

The following will describe the present invention in detail.

The adhesive hydrogel in accordance with the present invention contains a polymer matrix, another polymer component, water, and a polyhydric alcohol.

The polymer matrix is a matrix of a copolymer of a monofunctional monomer and a crosslinking monomer (a).

The monofunctional monomer is a compound with a single ethylenically unsaturated bond (polymerizable C-to-C double bond). Examples of the monofunctional monomer include at least one compound (b) selected from the group consisting of ethylenically unsaturated carboxylic acids, ethylenically unsaturated carboxylic acid salts, ethylenically unsaturated carboxylic acid derivatives having a hydroxyl group, an acid group, a salt thereof, an amino group, and/or an ammonium group, (meth)acrylamide and/or a (meth)acrylamide derivative (d), N-vinyl-2-pyrrolidone (e), and N-vinyl-2-caprolactam and/or N-vinyl-2-valerolactam (f). Any of these compounds may be used alone. Alternatively, two or more of them may be used in any combination. The at least one compound (b), (meth)acrylamide and/or (meth)acrylamide derivative (d), N-vinyl-2-pyrrolidone (e), and N-vinyl-2-caprolactam and/or N-vinyl-2-valerolactam (f) will be described later in detail.

The crosslinking monomer (a), although by no means limited in any particular manner, is preferably a crosslinking monomer with two or more ethylenically unsaturated bonds (polymerizable double bonds). Examples of the crosslinking monomer with two or more ethylenically unsaturated bonds include methylenebis(meth)acrylamide, ethylenebis(meth)acrylamide, (poly)ethylene glycol di(meth)acrylate, (poly)propylene glycol di(meth)acrylate, 1,9-nonanediol di(meth)acrylate, (poly)glycerin di(meth)acrylate, glycerin tri(meth)acrylate, trimethylolpropane tri(meth)acrylate, pentaerythritol tri(meth)acrylate, tetraallyloxyethane, and diallyl ammonium chloride. Any of these compounds may be used alone. Alternatively, two or more of them may be used in any combination.

Throughout the present specification and claims, "(meth)acrylamide" refers to either acrylamide or methacrylamide, and "(meth)acrylate" refers to either acrylate or methacrylate. "(Poly)ethylene glycol" refers to either ethylene glycol or polyethylene glycol. "Polyethylene glycol" is a structure with 2 to 10 ethylene glycol units. "(Poly)propylene glycol" refers to either propylene glycol or polypropylene glycol. "Polypropylene glycol" is a structure with 2 to 10 propylene glycol units. "(Poly)glycerin" refers to either glycerin or polyglycerin. Polyglycerin is a structure with 2 to 10 glycerin units.

The crosslinking monomer (a) is preferably at least one compound selected from the group consisting of N,N'-methylenebis(meth)acrylamide, N,N'-ethylenebis(meth)acrylamide, (poly)ethylene glycol di(meth)acrylate, (poly)propylene glycol di(meth)acrylate, glycerin di(meth)acrylate, glycerin tri(meth)acrylate, tetraallyloxyethane, and diallyl ammonium chloride. Use of these compounds leads to higher adhesive strength and greater fabricability.

When the monofunctional monomer has a functional group (e.g., a carboxyl group or a sulfonic acid group) that is reactive by way of elimination reaction or ring-opening reaction, the crosslinking monomer (a) may be preferably a crosslinking monomer with one or more ethylenically unsaturated bonds and one or more functional groups (e.g., epoxy groups, hydroxyl groups, or alkoxy groups) that are crosslinking by way of elimination reaction or ring-opening reaction. Examples of the crosslinking monomer with one or more ethylenically unsaturated bonds and one or more functional groups that are crosslinking by way of elimination reaction or ring-opening reaction include glycidyl (meth)acrylate and N-methylol acrylamide.

The content rate of structural units derived from the crosslinking monomer (a) in the adhesive hydrogel in accordance with the present invention, although by no means limited in any particular manner, is preferably greater than or equal to 0.01 wt %, and preferably less than or equal to 0.5 wt %. If the adhesive hydrogel contains structural units derived from the crosslinking monomer (a) in less than 0.01 wt %, the adhesive hydrogel has a crosslink density that is so low that the adhesive hydrogel could have low shape stability. When that is the case, the adhesive hydrogel may not be properly formed or may rupture when peeled from the skin. In addition, if the adhesive hydrogel contains structural units derived from the crosslinking monomer (a) in less than 0.01 wt % and is used in electrical measurement, variations in thickness of the adhesive hydrogel may render variations in measurement more likely. If the adhesive hydrogel contains structural units derived from the crosslinking monomer (a) in more than 0.5 wt %, the adhesive hydrogel may not exhibit sufficient adhesive strength to stick to the skin, or its plasticity may be so low that it could be brittle. The content rate of structural units derived from the crosslinking monomer (a) is more preferably greater than or equal to 0.03 wt %, and more preferably less than or equal to 0.1 wt %.

Either the structural unit derived from the monofunctional monomer contained in the polymer matrix or the other polymer component or both contain a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group (e.g., sulfonic acid group), a salt thereof (e.g., sulfonate group), an amino group, and/or an ammonium group (e.g., quaternary ammonium group). In other words, the monofunctional monomer contains the at least one compound (b), or the other polymer component contains a polymer of the at least one compound (b), or otherwise the monofunctional monomer contains the at least one compound (b) and the other polymer component contains a polymer of the at least one compound (b).

The structural unit derived from the at least one compound (b) contains at least one hydrophilic group selected from the group consisting of a carboxyl group, a carboxylic acid group, a hydroxyl group, acid groups other than carboxyl group, salts thereof, an amino group, and an ammonium group, and forms the hydrophilic backbone of the adhesive hydrogel to impart sufficient adhesive strength (especially, sufficient adhesive strength for the skin) to the adhesive hydrogel. The at least one compound (b) is also capable of lowering the quantity of residual monomers in the adhesive hydrogel because the compound (b) has excellent affinity for other monomers and is highly polymerizing.

The at least one compound (b) is by no means limited in any particular manner. Examples of the at least one compound (b) include $C_3$-$C_4$ α,β-ethylenically unsaturated monocarboxylic acids and salts thereof, such as (meth)acrylic acid and salts thereof and crotonic acid and salts thereof, ≥$C_5$ α,β-ethylenically unsaturated monocarboxylic acids and salts thereof, such as trans-cinnamic acid and salts thereof and sorbic acid and salts thereof; ethylenically unsaturated monocarboxylic acids and salts thereof, such as linoleic acid, except α,β-ethylenically unsaturated monocarboxylic acids; $C_4$-$C_5$ α,β-ethylenically unsaturated dicarboxylic acids and salts thereof, such as maleic acid and salts thereof, fumaric acid and salts thereof, and itaconic acid and salts thereof; (meth)acrylic acid derivatives with a hydroxyl group, such as (poly)ethylene glycol (meth)acrylate, (poly)propylene glycol (meth)acrylate, and (poly)glycerin (meth)acrylate; (meth)acrylic acid derivatives with an acid group or a salt thereof, such as sulfopropyl methacrylate (SPM) and salts thereof and (meth)acrylic acid derivatives with an amino group or an ammonium group, such as methacryloyloxyethyltrimethylammonium chloride (QDM). Examples of the various salts above include sodium salts, potassium salts, lithium salts, ammonium salts, and substituted ammonium salts. Any of these compounds may be used alone. Alternatively, two or more of them may be used in any combination.

Throughout the present specification and claims, "(meth)acrylic acid" refers to either acrylic acid or methacrylic acid.

The at least one compound (b) is preferably at least one compound selected from the group consisting of $C_3$-$C_4$ α,β-ethylenically unsaturated monocarboxylic acids and salts thereof, $C_4$-$C_5$ α,β-ethylenically unsaturated dicarboxylic acids and salts thereof, and (meth)acrylic acid derivatives (especially, (meth)acrylate esters) with a hydroxyl group, an acid group, a salt thereof, an amino group, and/or an ammonium group. These compounds are especially capable of lowering the quantity of residual monomers in the adhesive hydrogel because they have superior affinity for other monomers and are highly polymerizing.

The at least one compound (b) is more preferably at least one compound selected from the group consisting of (meth)acrylic acid and salts thereof, maleic acid and salts thereof, fumaric acid and salts thereof, itaconic acid and salts thereof, crotonic acid and salts thereof, (poly)ethylene glycol (meth)acrylate, (poly)propylene glycol (meth)acrylate, and (poly)glycerin (meth)acrylate. These compounds are especially capable of lowering the quantity of residual monomers in the adhesive hydrogel because they have superior affinity for other monomers and are highly polymerizing. The at least one compound (b) is especially preferably (meth)acrylic acid or a salt thereof for their high water solubility and easy manufacture.

The content rate of structural units derived from the at least one compound (b) in the adhesive hydrogel in accordance with the present invention, although by no means limited in any particular manner, is preferably greater than or equal to 0.1 wt % and preferably less than or equal to 30 wt %. If the adhesive hydrogel contains structural units derived from the at least one compound (b) in less than 0.1 wt %, the adhesive hydrogel may not exhibit sufficient initial adhesive strength, especially, to stick to the skin. If the adhesive hydrogel contains structural units derived from the at least one compound (b) in more than 30 wt %, the adhesive hydrogel may be of low quality. The content rate of structural units derived from the at least one compound (b) is more preferably greater than or equal to 0.3 wt % and more preferably less than or equal to 25 wt %.

The polymer of the at least one compound (b), as the other polymer component, is either a homopolymer or a copolymer of the at least one compound (b). The polymer of the at least one compound (b), although by no means limited in any particular manner, is preferably a copolymer containing a structural unit derived from the at least one compound (b) and a structural unit derived from acrylamide alkylsulfonic acid. When this is the case, the adhesive hydrogel follows a rough surface of the skin and other objects to which they are attached, keeping its adhesive strength, and maintains its cohesion. Therefore, the adhesive hydrogel has excellent fabricability and sticks to no other objects (e.g., clothes) than the objects to which they are attached. Under the same conditions, the adhesive hydrogel exhibits higher adhesive strength over repeated use.

Examples of the acrylamide alkylsulfonic acid include tert-butylacrylamide sulfonic acid (TBAS). A preferred, commercially available example of the copolymer containing a structural unit derived from the at least one compound (b) and a structural unit derived from acrylamide alkylsulfonic acid is a copolymer of acrylic acid and N-alkylsulfonic acid acrylamide (e.g., Aronvis® AH-305 (trade name), a copolymer of acrylic acid and tert-butylacrylamide sulfonic acid (TBAS), manufactured by Nihon Junyaku Co., Ltd.).

The content of the copolymer containing a structural unit derived from the at least one compound (b) and a structural unit derived from acrylamide alkylsulfonic acid in the adhesive hydrogel in accordance with the present invention is preferably greater than or equal to 0.1 parts by weight and less than or equal to 45 parts by weight, more preferably from 0.5 to 40 parts by weight, even more preferably from 0.5 to 35 parts by weight, still more preferably from 0.5 to 30 parts by weight, yet more preferably 0.5 to 25 parts by weight, yet more preferably 0.5 to 20 parts by weight, and yet more preferably 0.5 to 15 parts by weight, as based on 100 parts by weight of the non-water components of the adhesive hydrogel, to obtain an adhesive hydrogel with intended adhesiveness and processing properties.

If the copolymer containing a structural unit derived from the at least one compound (b) and a structural unit derived from acrylamide alkylsulfonic acid is a copolymer of the at least one compound (b) and acrylamide alkylsulfonic acid, the copolymerization ratio of the at least one compound (b) and the acrylamide alkylsulfonic acid is preferably from 2:8 to 8:2 and more preferably from 2:8 to 5:5.

The other polymer component contains a polymer compound (c) with a side chain having an oxyalkylene group or a polyoxyalkylene group. The polymer compound (c) orients on the surface of the adhesive hydrogel to improve the wettability of the surface of the adhesive hydrogel to the objects to which the adhesive hydrogel is attached (especially, the skin). This improves the adhesive strength of the adhesive hydrogel both initially and even after being used repeatedly (especially, the initial adhesive strength and the adhesive strength for the skin after being used repeatedly).

Examples of the polymer compound (c) include compounds containing at least one of segments of general formulae (1) to (4).

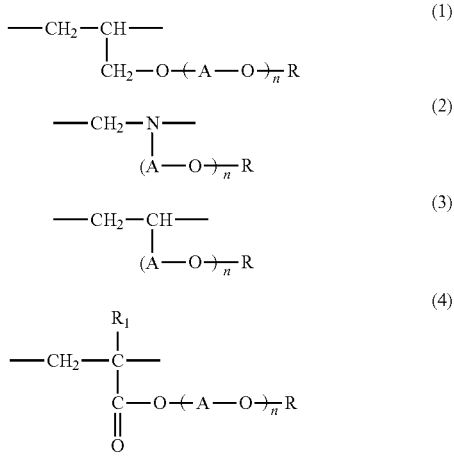

In general formulae (1) to (4), A is an alkylene group, R is a hydrogen, an alkyl group, or an aryl group, $R_1$ is a hydrogen or a methyl group, and n is one of integers from 1 to 100. The oxyalkylene group represented by "A-O" may be one type of oxyalkylene group or a plurality of types of oxyalkylene groups (e.g., an ethylene oxide group and a propylene oxide group). If the polymer compound (c) is a compound containing two or more of the segments of general formulae (1) to (4), A's in different segments may differ from each other, R's in different segments may differ from each other, and n's in different segments may differ from each other.

In general formulae (1) to (4), n is more preferably from 1 to 40. The alkylene group represented by "A" in general formulae (1) to (4) has more preferably 1 to 5 carbon atoms. If the substituent represented by "R" in general formulae (1) to (4) is an alkyl group or an aryl group, the alkyl group or aryl group has more preferably 1 to 25 carbon atoms.

The compound containing a segment of chemical formula (1) may be, for example, a commercially available one. Specific examples include the Malialim® series of products manufactured by NOF Corporation (polymer compounds containing repeating structural units including a segment of general formula (1), a segment derived from a maleic anhydride, and a segment derived from styrene). Examples of the Malialim® series of products include Malialim® AKM1511-60, Malialim® AKM0531 (a polymer compound containing repeating structural units including a segment of general formula (1), a segment derived from a maleic anhydride, and a segment derived from styrene, where the alkylene group represented by "A" is an ethylene group, the substituent represented by "R" is a methyl group, and n is 11), Malialim® AFB-1521 (a polymer compound containing repeating structural units including a segment of general formula (1), a segment derived from a maleic anhydride, and a segment derived from styrene, where the alkylene group represented by "A" is an ethylene group, the substituent represented by "R" is an ethyl group, and n is 28), Malialim® A-60, and Malialim® A-20. The compound containing a segment represented by chemical formula (1) may be a Uniox® series polymer manufactured by NOF Corporation (a polymer compound containing the repeating structural unit of general formula (1), where A is an ethylene group, and R is either a hydrogen or a methyl group) or a Unisafe® series polymer (a polymer compound containing the repeating structural unit of general formula (1), where A is either a propylene group or a combination of an ethylene group and a propylene group, and R is a hydrogen atom or a n-butyl group).

The compound containing a segment of chemical formula (2) may be, for example, a commercially available one. Specific examples include the Discall® series of products manufactured by Dai-ichi Kogyo Seiyaku Co., Ltd. (ethylene oxide/propylene oxide adducts of polyalkylene polyamine; polymer compounds containing repeating structural units including a segment of general formula (2) and a methylene group, where the alkylene group represented by "A" is a combination of an ethylene group and a propylene group, the substituent represented by "R" is a hydrogen atom, and n is 2). Examples of the Discall® series of products include Discall® N-509, Discall® N-518, Discall® 202, and Discall® 206.

The compound containing a segment of chemical formula (4) may be, for example, a commercially available one. Specific examples include the Blemmer® series of products manufactured by NOF Corporation. Examples of the Blemmer® series of products include Blemmer® PE-90 (a polymer compound containing the repeating structural unit of general formula (4), where A is an ethylene group, R is a hydrogen atom, $R_1$ is a methyl group, and n is about 2), Blemmer® PE-200 (a polymer compound containing the repeating structural unit of general formula (4), where A is an ethylene group, R is a hydrogen atom, $R_1$ is a methyl group, and n is about 4.5), Blemmer® PE-350 (a polymer compound containing the repeating structural unit of general formula (4), where A is an ethylene group, R is a hydrogen atom, $R_1$ is a methyl group, and n is about 8), Blemmer® PP-1000 (a polymer compound containing the repeating structural unit of general formula (4), where A is an propylene group, R is a hydrogen atom, $R_1$ is a methyl group, and n is about 4 to 6), Blemmer® PP-500 (a polymer compound containing the repeating structural unit of general formula (4), where A is an propylene group, R is a hydrogen atom, $R_1$ is a methyl group, and n is about 9), Blemmer® PP-800 (a polymer compound containing the repeating structural unit of general formula (4), where A is an propylene group, R is a hydrogen atom, $R_1$ is a methyl group, and n is about 13), Blemmer® 50 PEP-300 (a polymer compound containing the repeating structural unit of general formula (4), where A is a combination of an ethylene group and a propylene group, R is a hydrogen atom, $R_1$ is a methyl group, and n is about 6 (about 3.5 oxyethylene groups and about 2.5 oxypropylene groups)), Blemmer® 70 PEP-350B (a polymer compound containing the repeating structural unit of general formula (4), where A is a combination of an ethylene group and a propylene group, R is a hydrogen atom, $R_1$ is a methyl group, and n is about 7 (about 5 oxyethylene groups and about 2 oxypropylene groups)), Blemmer® 55 PET-800 (a polymer compound containing the repeating structural unit of general formula (4), where A is a combination of an ethylene groups and a tetramethylene groups, R is a hydrogen atom, $R_1$ is a methyl group, and n is about 15 (about 10 oxyethylene groups and about 5 oxytetramethylene groups)), Blemmer® PME-100 (a polymer compound containing the repeating structural unit of general formula (4), where A is an ethylene group, R is a methyl group, $R_1$ is a methyl group, and n is about 2), Blemmer® PME-200 (a polymer compound containing the repeating structural unit of general formula (4), where A is an ethylene group, R is a methyl group, $R_1$ is a methyl group, and n is about 4), Blemmer® PME-400 (a polymer compound containing the repeating structural unit of general formula (4), where A is an ethylene group, R is a methyl group, $R_1$ is a methyl group, and n is about 9), Blemmer® PME-1000 (a polymer compound containing the repeating structural unit of general formula (4), where A is an ethylene group, R is a methyl group, $R_1$ is a methyl group, and n is about 23), Blemmer® AE-200 (a polymer compound containing the repeating structural unit of general formula (4), where A is an ethylene group, R is a hydrogen atom, $R_1$ is a hydrogen atom, and n is about 4.5), Blemmer® AE-400 (a polymer compound containing the repeating structural unit of general formula (4), where A is an ethylene group, R is a hydrogen atom, $R_1$ a hydrogen atom, and n is about 10), Blemmer® AP-400 (a polymer compound containing the repeating structural unit of general formula (4), where A is an propylene group, R is a hydrogen atom, $R_1$ is a hydrogen atom, and n is about 6), Blemmer® AP-550 (a polymer compound containing the repeating structural unit of general formula (4), where A is an propylene group, R is a hydrogen atom, $R_1$ is a hydrogen atom, and n is about 9), and Blemmer® AME-400 (a polymer compound containing the repeating structural unit of general formula (4), where A is an propylene group, R is a methyl group, $R_1$ is a hydrogen atom, and n is about 9).

Examples of the polymer compound (c) include polymer compounds containing constituents derived from (poly)oxyalkylene allyl ether and/or polyalkylene glycol monoacrylate. These polymer compounds may homopolymers of (poly) oxyalkylene allyl ether and/or polyalkylene glycol monoacrylate and may be copolymers of (poly)oxyalkylene allyl ether and/or polyalkylene glycol monoacrylate and other compounds containing one or more unsaturated groups. Examples of the other compounds containing one or more unsaturated groups include α-olefins, styrene monomers, unsaturated carboxylic acid salts and unsaturated carboxylate esters (e.g., alkyl(meth)acrylate), vinyl esters of saturated carboxylic acids (e.g., vinyl acetate), and maleic anhydrides. Any of these compounds may be used alone. Alternatively, two or more of them may be used in any combination.

The content rate of structural units derived from the polymer compound (c) in the adhesive hydrogel in accordance with the present invention, although by no means limited in any particular manner, is preferably greater than or equal to 0.1 wt % and preferably less than or equal to 30 wt %. If the adhesive hydrogel contains structural units derived from the polymer compound (c) in less than 0.1 wt %, the structural units derived from the polymer compound (c) that are contained in the adhesive hydrogel do not produce sufficient effects. If the adhesive hydrogel contains structural units derived from the polymer compound (c) in more than 30 wt %, no adhesive hydrogel may form due to lack of uniformity. Under the same conditions, an adhesive hydrogel may be obtained, but could exhibit uneven adhesive strength or poor strength. The content rate of structural units derived from the polymer compound (c) is more preferably greater than or equal to 0.5 wt % and more preferably less than or equal to 20 wt % and even more preferably greater than or equal to 1 wt % and even more preferably less than or equal to 15 wt %.

The monofunctional monomer preferably contains the (meth)acrylamide and/or (meth)acrylamide derivative (d).

The (meth)acrylamide and/or (meth)acrylamide derivative (d) imparts to the adhesive hydrogel an initial adhesive strength that sufficiently fix the adhesive hydrogel, especially, to the skin and also reduces the horny layer peeling off the skin when the adhesive hydrogel is peeled from the skin, which maintains the adhesive strength over repeated use of the adhesive hydrogel.

The (meth)acrylamide and/or (meth)acrylamide derivative (d) is by no means limited in any particular manner so long as it is not a crosslinking monomer. Examples of the (meth)acrylamide and/or (meth)acrylamide derivative (d) include electrolyte-based (meth)acrylamide derivatives, such as tert-butylacrylamide sulfonic acid (TBAS), tert-butylacrylamide sulfonic acid salts, N,N-dimethylaminoethyl acrylamide (DMAEAA) hydrochloride, and N,N-dimethylaminopropyl acrylamide (DMAPAA) hydrochloride; and non-electrolyte-based (meth)acrylamide or derivatives thereof, such as (meth)acrylamide, N-methyl(meth)acrylamide, N-ethyl(meth)acrylamide, N-propyl(meth)acrylamide, N,N-dimethyl(meth)acrylamide, N,N-diethyl(meth)acrylamide, and acryloyl morpholine. Examples of the tert-butylacrylamide sulfonic acid salts include sodium salts, potassium salts, lithium salts, ammonium salts, and substituted ammonium salts. Any of these compounds may be used alone. Alternatively, two or more of them may be used in any combination.

If the (meth)acrylamide and/or (meth)acrylamide derivative (d) is at least one compound selected from the group consisting of the compounds listed above, the (meth)acrylamide and/or (meth)acrylamide derivative (d) especially imparts to the adhesive hydrogel an initial adhesive strength that sufficiently fix the adhesive hydrogel, especially, to the skin and also reduces the horny layer peeling off the skin when the adhesive hydrogel is peeled from the skin, which reduces roughening of the skin. The (meth)acrylamide and/or (meth)acrylamide derivative (d) is preferably a water-soluble compound, especially, for reasons, such as its high solubility in water and polyhydric alcohols and ease in polymerization with other monomers.

The content rate of structural units derived from the (meth)acrylamide and/or (meth)acrylamide derivative (d) in the adhesive hydrogel in accordance with the present invention is preferably greater than or equal to 2 wt % and less than or equal to 30 wt %. If the adhesive hydrogel contains structural units derived from the (meth)acrylamide and/or (meth)acrylamide derivative (d) in less than 2 wt %, the adhesive hydrogel has insufficient initial adhesive strength to fix, especially, to the skin. Under the same conditions, the adhesive hydrogel, for unknown reasons, will exhibit insufficient initial adhesive strength, and when peeled from the skin, cause roughening of the skin and lose much of its adhesive strength, having low adhesive strength after being used repeatedly. Under the same conditions, the polymerization of the monofunctional monomer, forming an adhesive hydrogel, may leave other monomers unreacted, which could complicate post-processing or degrade the resultant adhesive hydrogel. If the adhesive hydrogel contains structural units derived from the (meth)acrylamide and/or (meth)acrylamide derivative (d) in more than 30 wt %, the horny layer peels off when the adhesive hydrogel is peeled from the skin. That causes roughening of the skin and a large drop of adhesive strength, reducing the adhesive strength over repeated use. The content rate of structural units derived from the (meth)acrylamide and/or (meth)acrylamide derivative (d) is preferably greater than or equal to 3 wt % and preferably less than or equal to 25 wt %.

Either the structural unit derived from the monofunctional monomer contained in the polymer matrix or the other polymer component or both may contain a structural unit derived from N-vinyl-2-pyrrolidone (e). In other words, one of the following three situations may occur: (i) the monofunctional monomer contains N-vinyl-2-pyrrolidone (e), (ii) the other polymer component contains a (non-crosslinked) polymer of N-vinyl-2-pyrrolidone (e), or (iii) the monofunctional monomer contains N-vinyl-2-pyrrolidone (e) and the other polymer component contains a (non-crosslinked) polymer of N-vinyl-2-pyrrolidone (e). By either the polymer matrix or the other polymer component or both containing a structural unit derived from N-vinyl-2-pyrrolidone (e), the resultant adhesive hydrogel exhibits improved adhesive strength and elasticity.

The (non-crosslinked) polymer of N-vinyl-2-pyrrolidone (e) as the other polymer component is a homopolymer of N-vinyl-2-pyrrolidone, that is, polyvinylpyrrolidone, or a copolymer of N-vinyl-2-pyrrolidone. The copolymer of N-vinyl-2-pyrrolidone is by no means limited in any particular manner. Examples of the copolymer of N-vinyl-2-pyrrolidone include copolymers of N-vinyl-2-pyrrolidone and vinyl acetate, copolymers of N-vinyl-2-pyrrolidone and vinyl alcohol, copolymers of N-vinyl-2-pyrrolidone and N-vinyl-2-caprolactam, copolymers of N-vinyl-2-pyrrolidone and N-vinyl-2-valerolactam, and copolymers of N-vinyl-2-pyrrolidone and (meth)acrylic acid (each of these copolymers may be a random copolymer or a block copolymer).

If either the structural unit derived from the monofunctional monomer contained in the polymer matrix or the other polymer component or both contain a structural unit derived from N-vinyl-2-pyrrolidone (e), either the polymer matrix or the other polymer component or both preferably contain a copolymer containing a structural unit derived from N-vinyl-2-pyrrolidone (e) and a structural unit derived from (meth)acrylic acid. In other words, if the monofunctional monomer contains N-vinyl-2-pyrrolidone (e), the polymer matrix preferably contains a copolymer containing a structural unit derived from (meth)acrylic acid, a structural unit derived from N-vinyl-2-pyrrolidone (e), and a structural unit derived from the crosslinking monomer (a). If the other polymer component contains a (non-crosslinked) polymer of N-vinyl-2-pyrrolidone (e), the other polymer component preferably contains a copolymer containing a structural unit derived from N-vinyl-2-pyrrolidone (e) and a structural unit derived from (meth)acrylic acid, for example, a copolymer of N-vinyl-2-pyrrolidone and (meth)acrylic acid. The copolymer containing a structural unit derived from N-vinyl-2-pyrrolidone (e) and a structural unit derived from (meth)acrylic acid acts as a thickening agent that imparts adhesiveness to the resultant adhesive hydrogel.

The content rate of structural units derived from N-vinyl-2-pyrrolidone (e) in the adhesive hydrogel in accordance with the present invention, although by no means limited in any particular manner, is preferably greater than or equal to 0.1 wt % and preferably less than or equal to 20 wt %. If the adhesive hydrogel contains structural units derived from N-vinyl-2-pyrrolidone (e) in less than 0.1 wt %, the structural units derived from N-vinyl-2-pyrrolidone (e) that are contained in the adhesive hydrogel do not produce sufficient effects. If the adhesive hydrogel contains structural units derived from N-vinyl-2-pyrrolidone (e) in more than 20 wt %, no adhesive hydrogel may form due to lack of uniformity. An adhesive hydrogel, if ever obtained, may exhibit inconsistent adhesive strength. The content rate of structural units derived from N-vinyl-2-pyrrolidone (e) is more preferably greater than or equal to 0.2 wt % and more preferably less than or equal to 15 wt %.

The monofunctional monomer may contain N-vinyl-2-caprolactam and/or N-vinyl-2-valerolactam (f). N-vinyl-2-caprolactam and/or N-vinyl-2-valerolactam (f) adjust the viscosity and adhesive strength of the adhesive hydrogel and also reduce the horny layer peeling off the skin when the adhesive hydrogel is peeled from the skin, which improves the adhesive strength of the adhesive hydrogel over repeated use.

The content rate of structural units derived from N-vinyl-2-caprolactam and/or N-vinyl-2-valerolactam (f) in the adhesive hydrogel in accordance with the present invention, although by no means limited in any particular manner, is preferably greater than or equal to 0.1 wt % and preferably less than or equal to 25 wt %. If the adhesive hydrogel contains structural units derived from N-vinyl-2-caprolactam and/or N-vinyl-2-valerolactam (f) in less than 0.1 wt %, the horny layer peels off when the adhesive hydrogel is peeled from the skin. That causes roughening of the skin and a large drop of adhesive strength, reducing the adhesive strength over repeated use. If the adhesive hydrogel contains structural units derived from N-vinyl-2-caprolactam and/or N-vinyl-2-valerolactam (0 in more than 25 wt %, the adhesive hydrogel may have insufficient initial adhesive strength to fix, especially, to the skin. The content rate of structural units derived from N-vinyl-2-caprolactam and/or N-vinyl-2-valerolactam (f) is more preferably greater than or equal to 0.2 wt % and more preferably less than or equal to 20 wt %.

The monofunctional monomer may contain monomers other than those mentioned above. Examples of the other monomers include vinyl amide derivatives, such as vinylacetamide and vinylformamide; and allyl alcohols. Any of these other monomers may be used alone. Alternatively, two or more of them may be used in any combination.

The adhesive hydrogel in accordance with the present invention contains a polyhydric alcohol.

The polyhydric alcohol is by no means limited in any particular manner. Examples of the polyhydric alcohol include ethylene glycol, propylene glycol, butanediol, glycerin, pentaerythritol, sorbitol, polyethylene glycol, polypropylene glycol, polyglycerin, and polyoxyethylene polyglyceryl ether. If the polyhydric alcohol is at least one compound selected from the group consisting of these compounds, the polyhydric alcohol exhibits good solubility in the monofunctional monomer and the crosslinking monomer (a). Therefore, the adhesive hydrogel containing the polyhydric alcohol is, for example, more uniform and free from phase separation, exhibiting adhesive strength that deteriorates less over repeated use. Any of these compounds may be used alone. Alternatively, two or more of them may be used in any combination.

Preferred among these polyhydric alcohols are those polyhydric alcohols that are liquid in the temperature range at which the adhesive hydrogel is to be used (e.g., about 20° C. for indoor use): specifically, ethylene glycol, propylene glycol, glycerin, polyethylene glycol, and polyglycerin.

The content rate of the polyhydric alcohol in the adhesive hydrogel, although by no means limited in any particular manner, is preferably greater than or equal to 10 wt % and preferably less than or equal to 80 wt %. If the adhesive hydrogel contains the polyhydric alcohol in less than 10 wt %, the adhesive hydrogel exhibits low moisture retention capability, allowing more of the water content to evaporate. Therefore, the adhesive hydrogel lacks temporal stability and flexibility, possibly failing to exhibit sufficient adhesive strength. If the adhesive hydrogel contains the polyhydric alcohol in more than 80 wt %, the polyhydric alcohol may bleed out from the surface of the adhesive hydrogel, possibly causing the adhesive hydrogel to exhibit poor adhesive strength. Under the same conditions, the adhesive hydrogel is likely to be contaminated by bubbles during its manufacture. The content rate of the polyhydric alcohol is more preferably greater than or equal to 20 wt % and more preferably less than or equal to 70 wt %.

The adhesive hydrogel in accordance with the present invention contains water.

The content rate of water in the adhesive hydrogel in accordance with the present invention, although by no means limited in any particular manner, is preferably greater than or equal to 10 wt % and preferably less than or equal to 50 wt %. If the adhesive hydrogel contains less than 10 wt % water, the adhesive hydrogel has high hygroscopicity that may alter the adhesive hydrogel over time. If the adhesive hydrogel contains more than 50 wt % water, the adhesive hydrogel may shrink and change its physical properties as it dries out. The water content rate is more preferably greater than or equal to 12 wt % and more preferably less than or equal to 30 wt %.

The adhesive hydrogel in accordance with the present invention preferably further contains an electrolyte. The adhesive hydrogel, by containing an electrolyte, acquires sufficient electrical conductivity to provide a pressure sensitive adhesive that is suited for use with bioelectrodes, such as those used in electrocardiogram measurement, low-frequency therapy, and EMS, as well as various grounding electrodes. When the adhesive hydrogel is to be used as a pressure sensitive adhesive for these bioelectrodes, the adhesive hydrogel preferably has a resistivity of 0.1 kΩ·cm to 10 kΩ·cm.

The electrolyte may also be used as a pH-adjuster, an additive that improves the moisture retention capability of the adhesive hydrogel, or an antibacterial agent.

The electrolyte is by no means limited in any particular manner. Examples of the electrolyte include alkali metal halides, alkali earth metal halides, and other metal halides (sodium halides (e.g., sodium chloride), potassium halides, magnesium halides, calcium halides, etc.); various metal salts and ammonium salts of inorganic acids (e.g., hypochlorous acid, chlorous acid, chloric acid, perchloric acid, sulfuric acid, nitric acid, and phosphoric acid); various complex salts; various metal salts and ammonium salts of monovalent organic carboxylic acids (e.g., acetic acid, benzoic acid, and lactic acid); monovalent or multivalent, various metal salts and ammonium salts of multivalent carboxylic acids (e.g., phthalic acid, succinic acid, adipic acid, citric acid, and tartaric acid); various metal salts and ammonium salts of organic acids (e.g., sulfonic acid and amino acid); and various metal salts and ammonium salts (polymer electrolyte salts) of polyacids (e.g., poly(meth)acrylic acid, polyvinyl sulfonic acid, poly(tert-butylacrylamide sulfonic acid), polyallylamine, and polyethyleneimine). Any of these compounds may be used alone. Alternatively, two or more of them may be used in any combination.

If the adhesive hydrogel is to contain an electrolyte for the purpose of imparting sufficient electrical conductivity to the adhesive hydrogel in accordance with the present invention, the content rate of the electrolyte in the adhesive hydrogel in accordance with the present invention is preferably greater than or equal to 0.05 wt % and preferably less than or equal to 10 wt %. Water-containing adhesive hydrogels are intrinsically dielectric. If an electrode pad is manufactured by integrating a water-containing adhesive hydrogel and electrode elements, the adhesive hydrogel has a capacitance partially determined by the thickness of the adhesive hydrogel and the area of the electrode elements. However, the impedance (Z) of the electrode pad is greatly affected by the concentration of the electrolyte, especially, in the <1 kHz, low frequency range. If the adhesive hydrogel contains the electrolyte in less than 0.05 wt %, the electrode pad may have high impedance and hence be inappropriate to be used as an electrical conductive body. If the adhesive hydrogel contains the electrolyte in more than 10 wt %, it becomes difficult to dissolve the electrolyte in the adhesive hydrogel. That may, in turn, cause the electrolyte to precipitate, forming a crystal, in the adhesive hydrogel or disrupt dissolution of other components. Under the same conditions, the electrical conductivity of the adhesive hydrogel may no longer improve with the increasing amount of the electrolyte. No additional amounts of electrolyte would bring any benefit in terms of electrical conductivity. The content rate of the electrolyte is more preferably greater than or equal to 0.1 wt % and more preferably less than or equal to 2 wt %.

A base may be added to the adhesive hydrogel in accordance with the present invention for the purpose of adjusting the pH. If the polymer matrix or other polymer component contains an acid group, such as a carboxyl group or a sulfonic acid group, the acid group is converted to a salt by adding a base. The base is by no means limited in any particular manner. Examples of the base include sodium hydroxide, potassium hydroxide, lithium hydroxide, and ammonium hydroxide. The base is added preferably in such an amount that the adhesive hydrogel can have a pH of 3 to 6 and more preferably in such an amount that the adhesive hydrogel can have a pH of 4 to 5.

The adhesive hydrogel in accordance with the present invention may contain a surfactant. The surfactant increases the viscosity of the adhesive hydrogel and improves the wettability of the surface of the adhesive hydrogel to the objects to which the adhesive hydrogel is attached, thereby improving the adhesive strength of the adhesive hydrogel.

The surfactant is by no means limited in any particular manner. Examples of the surfactant include octylphenol ethoxylates (polyoxyethylene octylphenyl ethers), nonylphenol ethoxylates (polyoxyethylene nonylphenyl ethers), and derivatives thereof. Examples of suitable octylphenol ethoxylates include octoxynol-7 (which has seven oxyethylene units) and octoxynol-9 (which has nine oxyethylene units). Examples of suitable nonylphenol ethoxylates include nonoxynol-7 (which has seven oxyethylene units) and nonoxynol-9 (which has nine oxyethylene units). Any of these compounds may be used alone. Alternatively, two or more of them may be used in any combination.

The content rate of the surfactant in the adhesive hydrogel in accordance with the present invention is preferably from 0.01 wt % to 0.5 wt %, more preferably from 0.06 wt % to 0.2 wt %, and even more preferably from 0.08 wt % to 0.15 wt %. The surfactant is preferably so used as to impart a viscosity of 250 cps to 40,000 cps to the adhesive hydrogel.

The adhesive hydrogel in accordance with the present invention may, where necessary, further contain additives, such as preservative agents, disinfectants, anticorrosive agents, antioxidants, stabilizers, perfumes, coloring agents, anti-inflammatory agents, vitamin preparations, and whitening agents.

The adhesive hydrogel in accordance with the present invention may be manufactured, for example, by a method according to which a composition for adhesive hydrogel containing a monofunctional monomer, a crosslinking monomer (a), another polymer component, water, and a polyhydric alcohol is used, and the monofunctional monomer and the crosslinking monomer (a) are copolymerized to form a polymer matrix. If an adhesive hydrogel is manufactured by this method, the individual content rates of structural units derived from the monomers in the polymer matrix are substantially equal to the content rates of the monomers in the composition for adhesive hydrogel.

The combined content rate of the monomer components (monofunctional monomer and crosslinking monomer (a)) in the composition for adhesive hydrogel, although by no means limited in any particular manner, is preferably less than or equal to 50 wt %. If the composition for adhesive hydrogel contains the monomer components in more than 50 wt %, so much heat is generated in the polymerization that the reaction may "run away" to the extent that the composition for adhesive hydrogel could heat up beyond the boiling point of the solvent. If the composition for adhesive hydrogel reaches its boiling point, the adhesive hydrogel may be contaminated by bubbles. The combined content rate of the monomer components is preferably less than or equal to 40 wt %. The preferred minimum combined content rate of the monomer components is by no means limited in any particular manner and may be adjusted as appropriate so long as the constituents remain within their ranges discussed above.

The composition for adhesive hydrogel preferably contains a polymerization initiator. The polymerization initiator is by no means limited in any particular manner. Examples of the polymerization initiator include photo-radical polymerization initiators and thermal radical polymerization initiators.

The photo-radical polymerization initiator is by no means limited in any particular manner. Examples of the photo-radical polymerization initiator include α-hydroxy ketones, α-amino ketones, benzyl methyl ketals, bisacylphosphine oxides, and metallocenes. Specific examples include 1-[4-(2-hydroxyethoxy)-phenyl]-2-hydroxy-2-methyl-propan-1-one (product name: IRGACURE® 2959, manufactured by BASF Japan Ltd. (formerly, Ciba Specialty Chemicals)), 2-hydroxy-2-methyl-1-phenyl-1-propan-1-one (product name: DAROCUR® 1173, manufactured by BASF Japan Ltd.), 1-hydroxy-cyclohexyl-phenyl-ketone (product name: IRGACURE® 184, manufactured by BASF Japan Ltd.), 2-methyl-1-(4-methyl thiophenyl)-2-morpholinopropan-1-one (product name: IRGACURE® 907, manufactured by BASF Japan Ltd.), and 2-benzyl-2-dimethylamino-1-(4-morpholinophenyl)-butan-1-one (product name: IRGACURE® 369, manufactured by BASF Japan Ltd.).

These photo-radical initiators may be used alone. Alternatively, two or more of them may be used in any combination.

The thermal radical polymerization initiator is by no means limited in any particular manner. Examples of the thermal radical polymerization initiator include organic peroxides, such as benzoyl peroxide; azo-based polymerization initiators, such as azobisisobutyronitrile; persulfuric acid salts, such as potassium persulfate and ammonium persulfate; and azo compounds, such as 2,2-azobis-amidinopropane dihydrochloride. These polymerization initiators may, where necessary, be used in combination with hydrogen peroxide, sodium thiosulfate, or another redox initiator.

The content rate of the polymerization initiator in the composition for adhesive hydrogel, although by no means limited in any particular manner, is preferably greater than or equal to 0.01 wt % and preferably less than or equal to 1 wt %. If the composition for adhesive hydrogel contains the polymerization initiator in less than 0.01 wt %, the polymerization reaction may not sufficiently proceed. If the composition for adhesive hydrogel contains the polymerization initiator in more than 1 wt %, some of the polymerization initiator, remaining unreacted in the polymerization reaction, may discolor (yellow) the obtained adhesive hydrogel or give odor to the obtained adhesive hydrogel. The content rate of the polymerization initiator is more preferably greater than or equal to 0.05 wt % and more preferably less than or equal to 0.5 wt %.

The monofunctional monomer and the crosslinking monomer (a) may be copolymerized by any method which is by no means limited in any particular manner. For example, a composition for adhesive hydrogel containing a monofunctional monomer, a crosslinking monomer (a), another polymer component, water, and a polyhydric alcohol may be heated or subjected to ultraviolet light radiation for polymerization. If the adhesive hydrogel in accordance with the present invention is to be manufactured by ultraviolet light radiation, the integral ultraviolet light radiation dose is preferably from 1,000 mJ/cm$^2$ to 10,000 mJ/cm$^2$ and more preferably from 2,000 mJ/cm$^2$ to 10,000 mJ/cm$^2$.

Alternatively, the adhesive hydrogel in accordance with the present invention may be obtained by impregnating a polymer matrix formed in advance by polymerization reaction with another polymer component, water, and a polyhydric alcohol. Alternatively, a mixed polymer solution may be prepared by dissolving or uniformly dispersing a straight-chain polymer obtained by polymerizing the monofunctional monomer alone, another polymer component, water, and a polyhydric alcohol, and a crosslinking monomer (and a polymerization initiator, where necessary) be added to the mixed polymer solution for reaction of the straight-chain polymer with the crosslinking monomer, to produce a polymer matrix, thereby the adhesive hydrogel in accordance with the present invention is prepared.

The adhesive hydrogel in accordance with the present invention preferably exhibits an initial adhesive strength of greater than or equal to 0.9 N. The initial adhesive strength is measured as follows. A 20 mm×100 mm strip is cut out of a 0.75-mm thick sheet of the adhesive hydrogel. The strip is backed with nonwoven fabric to prepare a test piece which is then attached to a Bakelite plate (paper Bakelite manufactured by Sumitomo Bakelite Co., Ltd., item No.: PL113) and placed on a universal material testing instrument, TENSILON (manufactured by Orientec Co., Ltd.). The force when the strip peels off in the 90° direction at a rate of 300 mm/min is measured according to the JIS Z 0237 standard as the initial adhesive strength. Having an initial adhesive strength within the abovementioned range, the adhesive hydrogel in accordance with the present invention exhibits sufficient initial adhesive strength even if it is used, especially, as a pressure sensitive adhesive for bioelectrodes.

The adhesive hydrogel in accordance with the present invention preferably exhibits both an initial adhesive strength N1 and a post-use adhesive strength N10 of greater than or equal to 1.2 N. Having both the adhesive strengths N1 and N10 in the abovementioned range, the adhesive hydrogel in accordance with the present invention fixes sufficiently, especially, to the skin and exhibits an excellent adhesive force after being used repeatedly.

The initial adhesive strength N1 and the post-use adhesive strength N10 are measured as follows. A 20 mm×100 mm strip is cut out of a 0.75-mm thick sheet of the adhesive hydrogel. The strip is backed with nonwoven fabric ("Spunlace #8021" manufactured by Du Pont Kabushiki Kaisha) to prepare a test piece which is then attached to the skin on the inner side of the left arm which is wiped lightly beforehand with alcohol. Two minutes after the attaching, the force required to peel the test piece in the 180° direction at a rate of 1,000 mm/min is measured on a universal material testing instrument, TENSILON (manufactured by Orientec Co., Ltd.) as the initial adhesive strength N1. Next, the peeled test piece is attached to the skin on the inner side of the left arm and peeled. The process is repeated. The force required for the tenth peeling as counted from the first peeling is measured as the post-use adhesive strength N10.

Letting the adhesive strength retaining rate for the initial adhesive strength be equal to the numeric value obtained by dividing the post-use adhesive strength N10 by the initial adhesive strength N1 (=N10/N1), the adhesive strength retaining rate (N10/N1) is preferably 0.8 or higher. A drop of adhesive strength is due to the horny layer peeling off the skin and sticking to the surface of the adhesive hydrogel. Having an adhesive strength retaining rate (N10/N1) of 0.8 or higher, the adhesive hydrogel in accordance with the present invention reduces the horny layer peeling off the skin and also reduces skin irritation.

In the present specification, adhesive strengths are measured by the abovementioned process on six subjects (a male and a female in their twenties, a male and a female in their forties, and a male and a female in their fifties) at a temperature of 23° C. and a humidity of 60% RH. The measurements are averaged to calculate the adhesive strengths N1 and N10.
Exemplary Method of Molding Adhesive Hydrogel (into Gel Sheet)

The adhesive hydrogel is obtained by polymerizing and crosslinking a monofunctional monomer and a crosslinking monomer in a liquid composition for adhesive hydrogel (liquid mixture) for gelation, hence being moldable as appropriate for use. For example, the composition for adhesive hydrogel is dropped on a resin film or like base film. After the dropping, the composition for adhesive hydrogel is covered with a top film such as a resin film so that the composition for adhesive hydrogel can spread out under the top film to a desired controllable thickness. Light (ultraviolet light) is shone and/or heat is applied onto the composition for adhesive hydrogel in this condition to polymerize and crosslink the monofunctional monomer and the crosslinking monomer in the composition for adhesive hydrogel. Thus, the adhesive hydrogel is obtained with a desired thickness.

For example, if the adhesive hydrogel is to be used as a pressure sensitive adhesive, the adhesive hydrogel may be molded into a gel sheet with a thickness of 0.01 mm to 2.0 mm. The gel sheet may be provided with a protection film on one or both faces thereof.

The protection film for such a gel sheet may be publicly known and used as a separator (mold release paper) or a support. The gel sheet may be made by any method which is by no means limited in any particular manner and may be made by any publicly known method.

If the gel sheet is to be provided with a protection film on both faces thereof, the base film, or the lower protection film, may be a film of polyester, polyolefin, polystyrene, polyurethane, or like resin (resin film) or paper with or without resin film lamination.

If the base film is to be used as a separator, the surface of the base film where it comes into contact with the adhesive hydrogel is preferably provided with a silicone coating or otherwise treated for mold release. The base film used as a separator is preferably a film (e.g., a film of polyester, polyolefin, polystyrene or like resin (resin film) or paper with or without resin film lamination) that has its surface treated for mold release. The base film used as a separator is especially preferably, for example, a biaxially oriented PET (polyethylene terephthalate) film or an OPP (biaxially oriented polypropylene) film. The mold release treatment is, for example, silicone coating and especially preferably a baking type of silicone coating which involves crosslinking and curing reactions induced by heating or ultraviolet light radiation.

If the base film is to be used as a backing material (support) for an adhesive hydrogel instead of as a separator, the base film is preferably a film of polyester, polyolefin, polystyrene, polyurethane, or a like resin (resin film) that has not been treated for mold release. Of these films, the polyurethane film is an especially preferred base film because it is flexible and permeable to water vapor. The polyurethane film, if used as a base film, is preferably used laminated with, for example, polyolefin or paper as a carrier film because without lamination, it is very soft and difficult to handle during manufacture. The adhesive hydrogel is preferably manufactured with a carrier film being attached to the base film.

The top film, or an upper one of the protection films provided on the faces of the gel sheet, may be basically of the same substance as the base film. If the adhesive hydrogel is prepared by photo-polymerization of a composition for adhesive hydrogel sandwiched between a base film and a top film, the top film is preferably of substance that does not block light so that the base film does not disrupt photo-polymerization. The top film is preferably of the same substance as the base film that is used as a separator and not of the same substance as the base film that is used as a backing material. Especially, if the adhesive hydrogel is prepared by shining ultraviolet light from above a composition for adhesive hydrogel sandwiched between a base film and a top film, and the substance for the base film that is used as the backing material could probably deteriorate, for example, under ultraviolet light radiation, it is not preferable to use as the top film the same substance as the base film that is used as a backing material. This is because, under those conditions, the base film is disposed on the face onto which ultraviolet light is directly shone.

If the gel sheet is provided with a protection film only on one face thereof, the protection film may be of the same substance as the base film and the top film.

Exemplary Electrode Pad Containing Adhesive Hydrogel and Method of Manufacturing Electrode Pad The adhesive hydrogel in accordance with the present invention has a property that it safely adheres to, for example, the skin. The adhesive hydrogel in accordance with the present invention is also readily given electrical conductivity by an electrolyte properly added to it. Therefore, the adhesive hydrogel in accordance with the present invention can preferably be used as an electrode pad or other like adhesive conductive sites. The following will describe an example in which the adhesive hydrogel in accordance with the present invention is used as an electrode pad.

First, a layer of an adhesive hydrogel is formed on one face of a conductive layer into which carbon or another conductive substance is kneaded. Next, a layer of a non-conductive support is formed on the face opposite to the hydrogel. Copper wires and other conductive substances are fixed to the support so as to come to contact with the conductive layer, forming terminals. Electricity flows through the terminals from the outside or to, for example, an external monitor. Adhesive conductive sites are thus formed that are capable of conducting electricity through the conductive layer and the hydrogel to an object to which the adhesive hydrogel is attached.

The conductive layer may be, for example, a carbon-coated layer formed from a carbon paste using a polyester-based or polyurethane-based resin as a binder; a layer print-coated with conductive ink containing, for example, a metal, such as Ag/AgCl, or carbon; or a layer obtained by laminating, on a resin film, a conductive film containing a resin into which a conductive body, such as a metal foil (aluminum, stainless steel, Ag, etc.) or carbon is kneaded. The conductive layer is preferably so strong that it does not easily break off under a pull or other external force. If the conductive layer easily breaks off, the conductive layer may break during the manufacture of the electrode pad, the electrode pad, or the finished product, may be stretched and deformed, or a broken conductive layer in the electrode pad could lead to, for example, burns depending on how the user handles it. Meanwhile, the conductive layer needs to be flexible to be able to attach to rough skin surfaces. A conductive layer needs to be chosen that have physical properties that could cause no inconveniences when used.

For a film made of a stacked conductive layer and support, the terminals are formed by leaving parts of the film with no adhesive hydrogel when the adhesive hydrogel is disposed onto the conductive layer. The terminals (where no adhesive hydrogel is disposed) are nipped, for example, with clips for connection to lead wires.

Electrode pads with a swage structure are by no means limited in any particular manner so long as they are conductive. Structural parts located between snap terminals, or molded resin articles into which stainless steel or a like metal or carbon is kneaded, and elements, or molded resin articles coated with Ag/AgCl or a like other metal, serve as terminals for external connection.

If, for example, metal wires are used, metal wires are partly sandwiched between the conductive layer and the support. Parts of the conductive layer and the support where they do not form a stack structure are covered, for example, with a non-conductive resin. The tips of the metal wires are connected to lead wires for external connection.

The adhesive hydrogel in accordance with the present invention exhibits excellent adhesive strength over repeated use as mentioned above. The gel sheet and electrode pad prepared from the adhesive hydrogel exhibits excellent adhesive strength over repeated use that cannot be found with conventional products, thus having extended product life. That reduces the frequency at which the product needs to be replaced, thus contributing to conservation of resources. The adhesive hydrogel in accordance with the present invention also exhibits excellent initial adhesive strength. Furthermore, the adhesive hydrogel in accordance with the present invention does not abruptly reduce its adhesive strength over repeated use and reduces skin irritation.

EXAMPLES

The following will describe the present invention in more detail by way of examples. The present invention is by no means limited only to these examples.

Example 1

Acrylamide (18 parts by weight) as (meth)acrylamide and/or a (meth)acrylamide derivative (d) which is a monofunctional monomer, 0.03 parts by weight of N,N'-methylene bisacrylamide (MBAA) as a crosslinking monomer (a), 53.34 parts by weight of glycerin as a polyhydric alcohol, and 20 parts by weight of ion exchanged water were stirred and dissolved to prepare a monomer liquid mixture. 1-[4-(2-hydroxyethoxy)-phenyl]-2-hydroxy-2-methyl-propan-1-one (product name: IRGACURE® 2959, manufactured by BASF Japan Ltd.) (0.13 parts by weight) as a photo-radical polymerization initiator was added to the monomer liquid mixture, and the mixture was further stirred and dissolved.

Next, 0.5 parts by weight of a copolymer (trade name: "Aronvis® AH-305" manufactured by Nihon Junyaku Co., Ltd., weight-average molecular weight 4,500,000, identified as "AA/TBAS" in Table 1) of acrylic acid and tert-butylacrylamide sulfonic acid (TBAS) (copolymerization ratio=7:3; as another polymer component containing a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group) and 5 parts by weight of glycerin were stirred to disperse the copolymer in the glycerin to obtain a dispersion liquid. The obtained dispersion liquid was added gradually to the monomer liquid mixture which was then stirred for another 2 hours to obtain a composition for adhesive hydrogel. In the course of obtaining the composition for adhesive hydrogel, 1 parts by weight of Malialim® AKM1511-60 (manufactured by NOF Corporation) as a polymer compound with a side chain having an (c) oxyalkylene group or a polyoxyalkylene group and 2 parts by weight of sodium chloride as an electrolyte were used.

Next, the obtained composition for adhesive hydrogel was subjected to ultraviolet light radiation at an energy density of 3,000 $mJ/cm^2$ using a metal halide lamp to obtain a 0.75-mm thick sheet of adhesive hydrogel (gel sheet).

Examples 2 and 3 and Comparative Examples 1 to 3

The same procedures were followed as in example 1 except that different compositions were used as shown in Table 1, to prepare adhesive hydrogels (gel sheets).

Example 4

Acrylic acid (11.5 parts by weight) (as at least one compound (b), which is part of a monofunctional monomer, selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group), 7.6 parts by weight of tert-butylacrylamide sulfonic acid (TBAS) as (meth)acrylamide and/or a (meth)acrylamide derivative (d) which is also a part of a monofunctional monomer, 2.4 parts by weight of N-vinyl-2-caprolactam as N-vinyl-2-caprolactam and/or N-vinyl-2-valerolactam (f) which is also a part of a monofunctional monomer, 0.06 parts by weight of N,N'-methylene bisacrylamide (MBAA) as a crosslinking monomer (a), 2.4 parts by weight of polyvinylpyrrolidone (Dai-ichi Kogyo Seiyaku Co., Ltd.; CREEJUS® K-30, K=29.2) as another polymer component containing a structural unit derived from N-vinyl-2-pyrrolidone (e), 1 part by weight of "Malialim® AKM1511-60" (manufactured by NOF Corporation) as a polymer compound (c) with a side chain having an oxyalkylene group or a polyoxyalkylene group, 47 parts by weight glycerin as a polyhydric alcohol, 0.5 parts by weight of sodium chloride as an electrolyte, and 0.2 parts by weight of 1-[4-(2-hydroxyethoxy)-phenyl]-2-hydroxy-2-methyl-propan-1-one (product name: IRGACURE® 2959, manufactured by BASF Japan Ltd.) as a photo-radical polymerization initiator were stirred and dissolved to prepare a monomer liquid mixture.

Thereafter, 6.5 parts by weight of a 50 wt % aqueous NaOH solution was added to this liquid mixture to adjust pH to 4.0 to 5.0. Ion exchanged water was further added to adjust the water content to 20.84 parts by weight to obtain a composition for adhesive hydrogel.

Next, the obtained composition for adhesive hydrogel was subjected to ultraviolet light radiation at an energy density of 3,000 $mJ/cm^2$ using a metal halide lamp to obtain a 0.75-mm thick sheet of adhesive hydrogel (gel sheet).

Examples 5 to 11 and Comparative Examples 4 and 5

The same procedures were followed as in example 4 except that different compositions were used as shown in Table 2, to prepare adhesive hydrogels (gel sheets).

Examples 12 to 15 and Comparative Examples 6 and 7

The same procedures were followed as in example 4 except that different compositions were used as shown in Table 3, to prepare adhesive hydrogels (gel sheets).

Method of Measuring Initial Adhesive Strength (90° Peeling) to Bakelite Plate

A 20 mm×100 mm strip was cut out of each adhesive hydrogel prepared in examples and comparative examples. The strip was backed with nonwoven fabric ("Spunlace #8021" manufactured by Du Pont Kabushiki Kaisha; 0.38 mm thick) to prepare a test piece which was then attached to a Bakelite plate (paper Bakelite manufactured by Sumitomo Bakelite Co., Ltd., item No.: PL113) and placed on a universal material testing instrument, TENSILON (manufactured by Orientec Co., Ltd.). The force when the strip peeled off in the 90° direction at a rate of 300 mm/min was measured according to JIS Z 0237 as the initial adhesive strength (for the Bakelite plate). Results of the measurements are shown in Tables 1 to 3.

Method of Measuring Adhesive Strength (180° Peeling) to Skin after being Used Repeatedly A 20 mm×100 mm strip was cut out of each adhesive hydrogel prepared in examples and comparative examples. The strip was backed with nonwoven fabric ("Spunlace #8021" manufactured by Du Pont Kabushiki Kaisha; 0.38 mm thick) to prepare a test piece which was then attached to the skin on the inner side of the left arm which was wiped lightly beforehand with alcohol. Two minutes after the attaching, the force required to peel the test piece in the 180° direction at a rate of 1,000 mm/min was measured on a universal material testing instrument, TENSILON (manufactured by Orientec Co., Ltd.) as the initial adhesive strength N1. Next, the peeled test piece was attached to the skin on the inner side of the left arm and peeled. The process was repeated. The force required for the tenth peeling as counted from the first peeling was measured as the post-use adhesive strength N10. The numeric value obtained by dividing the post-use adhesive strength N10 by the initial adhesive strength N1 (=N10/N1) was designated as the adhesive strength retaining rate for the initial adhesive strength.

The adhesive strengths N1 and N10 were measured on the inner side of the left arm of six subjects (a male and a female in their twenties, a male and a female in their forties, and a male and a female in their fifties) at a temperature of 23° C. and a humidity of 60% RH. The measurements were averaged to calculate the adhesive strengths N1 and N10 which are shown in Tables 1 to 3.

TABLE 1

| Component | | Composition | Examples 1 | 2 | 3 | Comparative Examples 1 | 2 | 3 |
|---|---|---|---|---|---|---|---|---|
| Blend Ratio (wt %) | a | MBAA | 0.03 | 0.03 | 0.03 | 0.03 | 0.03 | 0.03 |
| | b | AA/TBAS Polymer | 0.5 | 0.5 | 0.5 | 0 | 0.5 | 0 |
| | c | Malialim ® AKM1511-60 (Solid Equivalent) | 1 | 3 | 6 | 3 | 0 | 0 |
| | d | Acrylamide | 18 | 18 | 18 | 18 | 18 | 18 |
| | | Polyhydric Alcohol   Glycerin | 58.34 | 56.34 | 53.34 | 56.84 | 59.34 | 59.84 |
| | | Water | 20 | 20 | 20 | 20 | 20 | 20 |
| | | Photo-radical Polymerization Initiator | 0.13 | 0.13 | 0.13 | 0.13 | 0.13 | 0.13 |
| | | Electrolyte   NaCl | 2 | 2 | 2 | 2 | 2 | 2 |
| Evaluation | | Thickness of Adhesive Hydrogel (mm) | 0.75 | 0.75 | 0.75 | 0.75 | 0.75 | 0.75 |
| | | Initial Adhesive Strength to Bakelite Plate (N) | 4.86 | 3.71 | 2.71 | 3.83 | 5.55 | 4.65 |
| | | Adhesive Strength to Skin after Repeated Use (N)   Initial Adhesive Strength N1 | 2.84 | 3.11 | 2.47 | 0.72 | 1.8 | 1.06 |
| | | Post-use Adhesive Strength N10 | 2.31 | 2.62 | 2.25 | 0.54 | 1.15 | 0.42 |
| | | Adhesive Strength Retaining Rate N10/N1 | 0.81 | 0.84 | 0.91 | 0.75 | 0.64 | 0.39 |

TABLE 2

| Component | | Composition | Examples 4 | 5 | 6 | 7 | 8 | 9 | 10 | 11 | Comparative Examples 4 | 5 |
|---|---|---|---|---|---|---|---|---|---|---|---|---|
| Blend Ratio (wt %) | a | MBAA | 0.06 | 0.06 | 0.06 | 0.06 | 0.06 | 0.06 | 0.06 | 0.06 | 0.06 | 0.06 |
| | b | Acrylic Acid | 11.5 | 11.5 | 11.5 | 11.5 | 11.5 | 11.5 | 11.5 | 11.5 | 11.5 | 11.5 |
| | c | Malialim ® AKM1511-60 (Solid Equivalent) | 1 | 5 | 10 | 12 | 0 | 0 | 0 | 2.5 | 0 | 0 |
| | | Malialim ® AKM0531 | 0 | 0 | 0 | 0 | 5 | 0 | 0 | 0 | 0 | 0 |
| | | Discall ® N-518 (Solid Equivalent) | 0 | 0 | 0 | 0 | 0 | 1 | 3 | 0 | 0 | 0 |
| | d | TBAS | 7.6 | 7.6 | 7.6 | 7.6 | 7.6 | 7.6 | 7.6 | 7.6 | 7.6 | 7.6 |
| | e | Polyvinylpyrrolidone | 2.4 | 2.4 | 2.4 | 2.4 | 2.4 | 2.4 | 2.4 | 0 | 2.4 | 0 |
| | f | N-vinyl-2-caprolactam | 2.4 | 2.4 | 2.4 | 2.4 | 2.4 | 2.4 | 2.4 | 4.8 | 2.4 | 4.8 |
| | | Polyhydric Alcohol   Glycerin | 47 | 43 | 38 | 36 | 43 | 47 | 45 | 45.5 | 48 | 48 |
| | | Water | 20.84 | 20.84 | 20.84 | 20.84 | 20.84 | 20.84 | 20.84 | 20.84 | 20.84 | 20.84 |
| | | Photo-radical Polymerization Initiator | 0.2 | 0.2 | 0.2 | 0.2 | 0.2 | 0.2 | 0.2 | 0.2 | 0.2 | 0.2 |
| | | Electrolyte   NaCl | 0.5 | 0.5 | 0.5 | 0.5 | 0.5 | 0.5 | 0.5 | 0.5 | 0.5 | 0.5 |
| | | 50% NaOH | 6.5 | 6.5 | 6.5 | 6.5 | 6.5 | 6.5 | 6.5 | 6.5 | 6.5 | 6.5 |
| Evaluation | | Thickness of Adhesive Hydrogel (mm) | 0.75 | 0.75 | 0.75 | 0.75 | 0.75 | 0.75 | 0.75 | 0.75 | 0.75 | 0.75 |
| | | Initial Adhesive Strength to Bakelite Plate (N) | 1.93 | 1.95 | 2.40 | 3.51 | 2.40 | 2.10 | 2.50 | 1.66 | 1.90 | 1.60 |

TABLE 2-continued

|  |  | Examples | | | | | | | | Comparative Examples | |
|---|---|---|---|---|---|---|---|---|---|---|---|
| Component | Composition | 4 | 5 | 6 | 7 | 8 | 9 | 10 | 11 | 4 | 5 |
| Adhesive Strength to Skin after Repeated Use (N) | Initial Adhesive Strength N1 | 1.78 | 2.03 | 2.12 | 2.92 | 1.47 | 1.85 | 2.08 | 1.35 | 1.12 | 0.98 |
| | Post-use Adhesive Strength N10 | 1.76 | 1.97 | 1.85 | 2.51 | 1.33 | 1.65 | 1.85 | 1.34 | 1.02 | 0.90 |
| | Adhesive Strength Retaining Rate N10/N1 | 0.98 | 0.97 | 0.87 | 0.86 | 0.90 | 0.91 | 0.88 | 0.99 | 0.91 | 0.91 |

TABLE 3

| | | | Examples | | | | Comparative Examples | |
|---|---|---|---|---|---|---|---|---|
| | Component | Composition | 12 | 13 | 14 | 15 | 6 | 7 |
| Blend Ratio (wt %) | a | MBAA | 0.04 | 0.04 | 0.04 | 0.04 | 0.04 | 0.04 |
| | b | Acrylic Acid | 21.5 | 12.9 | 21.5 | 12.9 | 0 | 0 |
| | c | Malialim ® AKM1511-60 (Solid Equivalent) | 5 | 5 | 0 | 0 | 0 | 0 |
| | | Discall ® N-518 (Solid Equivalent) | 0 | 0 | 3 | 3 | 1 | 3 |
| | d | TBAS | 0 | 8.6 | 0 | 8.6 | 0 | 0 |
| | | Acrylamide | 0 | 0 | 0 | 0 | 20 | 20 |
| | e | Polyvinylpyrrolidone | 0 | 0 | 0 | 0 | 0 | 0 |
| | f | N-vinyl-2-caprolactam | 0 | 0 | 0 | 0 | 0 | 0 |
| | | Polyhydric Alcohol Glycerin | 43.91 | 47.92 | 45.91 | 49.91 | 58.1 | 56.1 |
| | | Water | 20.85 | 20.84 | 20.85 | 20.85 | 18.16 | 18.16 |
| | | Photo-radical Polymerization Initiator | 0.2 | 0.2 | 0.2 | 0.2 | 0.2 | 0.2 |
| | | Electrolyte NaCl | 0.5 | 0.5 | 0.5 | 0.5 | 2.5 | 2.5 |
| | | 50% NaOH | 8 | 4 | 8 | 4 | 0 | 0 |
| Evaluation | Thickness of Adhesive Hydrogel (mm) | | 0.75 | 0.75 | 0.75 | 0.75 | 0.75 | 0.75 |
| | Initial Adhesive Strength to Bakelite Plate (N) | | 2.6 | 2.8 | 1.5 | 1.7 | 5 | 5.3 |
| | Adhesive Strength to Skin after Repeated Use (N) | Initial Adhesive Strength N1 | 2.12 | 2.73 | 1.49 | 1.46 | 0.84 | 0.68 |
| | | Post-use Adhesive Strength N10 | 1.96 | 2.58 | 1.24 | 1.32 | 0.32 | 0.31 |
| | | Adhesive Strength Retaining Rate N10/N1 | 0.92 | 0.95 | 0.83 | 0.9 | 0.32 | 0.31 |

A comparison of examples 1 to 3 and comparative examples 1 to 3 reveals that the provision, in a polymer matrix that is part of an adhesive hydrogel, of a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group and the provision, in the adhesive hydrogel, of a polymer compound (c) with a side chain having an oxyalkylene group or a polyoxyalkylene group improve both the initial adhesive strength N1 and the post-use adhesive strength N10 (for the tenth peeling) on the skin and also maintain the initial adhesive strength to Bakelite plates at sufficiently high levels (greater than or equal to 2 N). The adhesive hydrogel of comparative example 2 exhibits an excellent initial adhesive strength N1 and an excellent post-use adhesive strength N10 (for tenth peeling), but an adhesive strength retaining rate N10/N1 as low as 0.6. These results would be an indicator of skin irritation caused by the horn peeling off from the skin over repeated use. In contrast, the adhesive hydrogels of examples 1 to 3 exhibit adhesive strength retaining rates N10/N1 as high as 0.81 to 0.91 and show no abrupt drop of adhesive strength over repeated use. These results would be an indicator of reduced skin irritation.

A comparison of example 4 to 10 and comparative example 4 and a comparison of example 11 and comparative example 5 reveals that the provision, in the adhesive hydrogel, of another polymer component containing a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group and the provision, in the adhesive hydrogel, of a polymer compound (c) with a side chain having an oxyalkylene group or a polyoxyalkylene group improve all the initial adhesive strength on Bakelite plates, the initial adhesive strength N1 on the skin, and the post-use adhesive strength N10 (for tenth removal) on the skin. The adhesive hydrogels of example 4 to 10 exhibit adhesive strength retaining rates N10/N1 as high as 0.86 to 0.99 and shows no abrupt drop of adhesive strength over repeated use. These results would be an indicator of reduced skin irritation.

A comparison of example 11 to 15 and comparative example 6 to 7 reveals that the provision, in the adhesive hydrogel, of another polymer component containing a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group and the provision, in the adhesive hydrogel, of a polymer compound (c) with a side chain having an oxyalkylene group or a polyoxyalkylene group improve both the initial adhesive strength N1 on the skin and the post-use adhesive strength N10 (for tenth removal) on the skin even if the adhesive hydrogel does not contain both a structural unit derived from N-vinyl-2-pyrrolidone (e) and a structural unit derived from N-vinyl-2-caprolactam and/or N-vinyl-2-valerolactam (f) or even if the adhesive hydrogel contains no structural unit derived from N-vinyl-2-pyrrolidone (e), no structural unit derived from N-vinyl-2-caprolactam and/or N-vinyl-2-valerolactam (f), and no structural unit derived from (meth)acrylamide and/or (meth)acrylamide derivative (d). The adhesive hydrogels of example 11 to 15 exhibit adhesive strength retaining rates N10/N1 as high as 0.83 to 0.95 and shows no abrupt drop of adhesive strength over repeated use. These results would be an indicator of reduced skin irritation.

It is hence concluded that the adhesive hydrogels prepared in examples 1 to 15 exhibit excellent adhesive strength both initially and after being used repeatedly without a need for washing in water or any other like special jobs and also show no abrupt drop of adhesive strength over repeated use and reduced skin irritation.

The invention claimed is:

1. An adhesive hydrogel, comprising: a polymer matrix of a copolymer of a monofunctional monomer and a crosslinking monomer (a); another polymer component; water; and a polyhydric alcohol, wherein:

either a structural unit derived from the monofunctional monomer contained in the polymer matrix or the other polymer component or both contain a structural unit derived from at least one compound (b) selected from the group consisting of ethylenically unsaturated carboxylic acids, ethylenically unsaturated carboxylic acid salts, and ethylenically unsaturated carboxylic acid derivatives having a hydroxyl group, an acid group, a salt thereof, an amino group, and/or an ammonium group; and the other polymer component contains a polymer compound (c) with a side chain having an oxyalkylene group or a polyoxyalkylene group, wherein the polymer compound (c) contains at least one of segments (1) to (4):

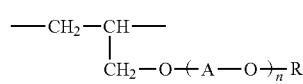

(1)

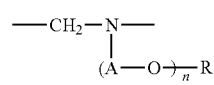

(2)

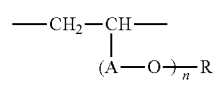

(3)

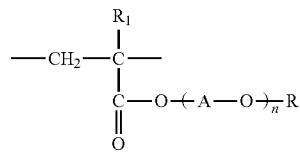

(4)

where A is an alkylene group, R is a hydrogen, an alkyl group, or an aryl group, n is one of integers from 1 to 100, and $R_1$ in general formula (4) is a hydrogen or a methyl group, said adhesive hydrogel containing the polymer compound (c) in an amount of 0.1 wt % to 30 wt %.

2. The adhesive hydrogel as set forth in claim 1, wherein the monofunctional monomer contains (meth)acrylamide and/or a (meth)acrylamide derivative (d).

3. The adhesive hydrogel as set forth in claim 2, said adhesive hydrogel containing structural units derived from the (meth)acrylamide and/or (meth)acrylamide derivative (d) in 2 wt % to 30 wt %.

4. The adhesive hydrogel as set forth in claim 2, wherein the (meth)acrylamide and/or (meth)acrylamide derivative (d) is at least one compound selected from the group consisting of tert-butylacrylamide sulfonic acid (TBAS), tert-butylacrylamide sulfonic acid salts, N,N-dimethylaminoethyl acrylamide (DMAEAA) hydrochloride, N,N-dimethylaminopropyl acrylamide (DMAPAA) hydrochloride, (meth) acrylamide, N-methyl(meth)acrylamide, N-ethyl(meth) acrylamide, N-propyl(meth)acrylamide, N,N-dimethyl (meth)acrylamide, N,N-diethyl(meth)acrylamide, and acryloyl morpholine.

5. The adhesive hydrogel as set forth in claim 1, wherein either the structural unit derived from the monofunctional monomer contained in the polymer matrix or the other polymer component or both contain a structural unit derived from N-vinyl-2-pyrrolidone (e).

6. The adhesive hydrogel as set forth in claim 5, said adhesive hydrogel containing structural units derived from N-vinyl-2-pyrrolidone (e) in 0.1 wt % to 20 wt %.

7. The adhesive hydrogel as set forth in claim 5, wherein either the polymer matrix or the other polymer component or both contain a copolymer having a structural unit derived from N-vinyl-2-pyrrolidone (e) and a structural unit derived from (meth)acrylic acid.

8. The adhesive hydrogel as set forth in claim 1, wherein the monofunctional monomer contains N-vinyl-2-caprolactam and/or N-vinyl-2-valerolactam (f).

9. The adhesive hydrogel as set forth in claim 8, said adhesive hydrogel containing the at least one compound (b) in 0.1 wt % to 30 wt % and structural units derived from the N-vinyl-2-caprolactam and/or N-vinyl-2-valerolactam (f) in 0.1 wt % to 25 wt %.

10. The adhesive hydrogel as set forth in claim 1, further comprising a surfactant.

11. The adhesive hydrogel as set forth in claim 1, wherein the polyhydric alcohol is at least one compound selected from the group consisting of ethylene glycol, propylene glycol, butanediol, glycerin, pentaerythritol, sorbitol, polyethylene glycol, polypropylene glycol, polyglycerin, and polyoxyethylene polyglyceryl ether.

12. The adhesive hydrogel as set forth in claim 1, wherein the at least one compound (b) is at least one compound selected from the group consisting of (meth)acrylic acid and salts thereof, maleic acid and salts thereof, fumaric acid and salts thereof, itaconic acid and salts thereof, crotonic acid and salts thereof, (poly)ethylene glycol (meth)acrylate, (poly)propylene glycol (meth)acrylate, and (poly)glycerin (meth)acrylate.

13. The adhesive hydrogel as set forth in claim 1, wherein the crosslinking monomer (a) is at least one compound selected from the group consisting of methylenebis(meth)acrylamide, ethylenebis(meth)acrylamide, (poly)ethylene glycol di(meth)acrylate, (poly)propylene glycol di(meth)acrylate, 1,9-nonanediol di(meth)acrylate, glycerin di(meth)acrylate, glycerin tri(meth)acrylate, tetraallyloxyethane, and diallyl ammonium chloride.

14. The adhesive hydrogel as set forth in claim 1, further comprising an electrolyte.

15. A gel sheet comprising the adhesive hydrogel as set forth in claim 1.

16. An electrode pad comprising the adhesive hydrogel as set forth in claim 1.

* * * * *